United States Patent
Cragun

(10) Patent No.: US 9,497,408 B2
(45) Date of Patent: *Nov. 15, 2016

(54) METHOD AND APPARATUS FOR COOPERATIVE RECORDING

(71) Applicant: International Business Machines Corporation, Armonk, NY (US)

(72) Inventor: Brian J. Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,863

(22) Filed: Sep. 22, 2015

(65) Prior Publication Data

US 2016/0014369 A1    Jan. 14, 2016

Related U.S. Application Data

(63) Continuation of application No. 10/787,602, filed on Feb. 26, 2004, now Pat. No. 9,148,585.

(51) Int. Cl.
| | |
|---|---|
| *H04N 9/80* | (2006.01) |
| *H04N 5/77* | (2006.01) |
| *H04N 5/247* | (2006.01) |
| *H04N 5/765* | (2006.01) |
| *H04N 7/18* | (2006.01) |
| *H04N 21/2743* | (2011.01) |
| *H04N 5/225* | (2006.01) |
| *H04N 5/372* | (2011.01) |

(52) U.S. Cl.
CPC ............ *H04N 5/772* (2013.01); *H04N 5/2258* (2013.01); *H04N 5/247* (2013.01); *H04N 5/372* (2013.01); *H04N 5/765* (2013.01); *H04N 7/18* (2013.01); *H04N 21/2743* (2013.01)

(58) Field of Classification Search
None
See application file for complete search history.

(56) References Cited

U.S. PATENT DOCUMENTS

| | | |
|---|---|---|
| 4,849,817 A | 7/1989 | Short |
| 6,154,600 A | 11/2000 | Newman et al. |
| 6,271,876 B1 | 8/2001 | McIntyre et al. |
| 6,591,253 B1 | 7/2003 | Dinkin et al. |

(Continued)

OTHER PUBLICATIONS

Federal Communications Commission FCC 02-48, First Report and Order, Adopted Feb. 14, 2002.

*Primary Examiner* — Heather Jones
(74) *Attorney, Agent, or Firm* — Grant A Johnson

(57) ABSTRACT

A method, system, and article of manufacture that allows amateur camera operators to share video and audio with other amateur camera operators at the same event over a cooperative, ad hoc network. One embodiment of the present invention comprises forming an ad hoc network comprising a plurality of recording devices, and communicating audiovisual signals between the plurality of recording devices in the ad hoc network. In some embodiments, this method may further comprise transmitting a replay request to the plurality of recording devices and receiving an audiovisual signal corresponding to the replay request, transmitting a push request to the plurality of recording devices, and/or transmitting a message to at least one of the plurality of recording devices.

19 Claims, 10 Drawing Sheets

(56) References Cited

U.S. PATENT DOCUMENTS

| | | | |
|---|---|---|---|
| 6,741,271 B1 * | 5/2004 | McConica | ........ H04L 29/12113 |
| | | | 709/204 |
| 7,130,807 B1 | 10/2006 | Mikurak | |
| 7,664,711 B2 | 2/2010 | Agarwal et al. | |
| 7,725,015 B2 | 5/2010 | Tanoue | |
| 2003/0189649 A1 | 10/2003 | Kuno | |
| 2003/0235175 A1 | 12/2003 | Naghian et al. | |
| 2004/0101166 A1 | 5/2004 | Williams et al. | |
| 2014/0222610 A1 | 8/2014 | Mikurak | |

* cited by examiner

METHOD AND APPARATUS FOR COOPERATIVE RECORDING

CROSS-REFERENCE TO RELATED APPLICATIONS

The present application is a continuation of commonly-owned U.S. patent application Ser. No. 10/787,602, filed Feb. 26, 2004. The present application is also related to commonly-owned U.S. Pat No. 6,591,253, entitled "Method and System for Real Time Pricing of Fine-Grained Resource Purchases", and commonly owned U.S. Pat No. 7,664,711, entitled "Apparatus, Methods and Computer Programs for Metering and Accounting for Services Accessed Over a Network."

TECHNICAL FIELD

This invention generally relates method of recording audiovisual signals. More specifically, the present invention relates to methods and systems for recording events through real-time, ad hoc sharing of audiovisual signals.

BACKGROUND

The introduction of the Kodak Brownie camera in 1900 is often cited as the start of popular photography. Almost immediately, amateur photographers began to use the devices to memorialize the activities of their friends and families. The subsequent popularization of movie cameras, video cassette recording ("VCR") cameras, and today's digital video cameras have greatly enhanced the amateur camera operator's ability to memorialize people and events.

Despite these improvements in recording technology, one problem still faced by today's amateur photographer is that, when filming an event such as a school concert or a sporting event, the amateur camera operator is hindered by having only one recording device. Thus, for example, by zooming in on one area to show the events in more detail, the amateur camera operator may miss important context that they would only capture using a wide angle shot. Similarly, the amateur photographer's view of some significant events may be sub-optimal due to their location, or in extreme cases, may even be blocked by a tree, column, or another spectator's head. Further, a photographer may not anticipate an event and may have their camera powered-off at the moment of the event. These problems are magnified at unscripted events, such as sporting events, where many memorable events are unpredictable Professional filming crews solve these issues using multiple cameras and camera operators, each strategically placed, together with a director who selects which to record using a mixing board. The director may also be able to communicate with each of the camera operators so that they can work cooperatively and reposition themselves for optimal views. Although this approach produces a high quality results, the cost is beyond the reach of most amateurs.

Without a way to for the amateur camera operator to get the advantages of multiple recording devices, the promise of personal video cameras may never be fully achieved.

SUMMARY

The present invention provides a method, system, and article of manufacture that allows amateur camera operators to share video and audio with other amateur camera operators at the same event over a cooperative, ad hoc network.

Accordingly, one aspect of the present invention is a method of recording events. One embodiment of this method comprises forming an ad hoc network comprising a plurality of recording devices, and communicating audiovisual signals between the plurality of recording devices in the ad hoc network. In some embodiments, this method may further comprise transmitting a replay request to the plurality of recording devices and receiving an audiovisual signal corresponding to the replay request, transmitting a push request to the plurality of recording devices, and/or transmitting a message to at least one of the plurality of recording devices.

Another aspect of the present invention is a method of sharing information between portable electronic devices. One embodiment of this method comprises detecting a plurality of portable electronic devices at an event site, forming an ad hoc network comprising the plurality of portable electronic devices, and wirelessly transmitting information between the portable electronic devices. In some embodiments, this method may further comprise receiving a request to join the ad hoc network from a new portable electronic device, and wirelessly transmitting an encryption key to the new portable electronic device. In some embodiments, the information comprises an audiovisual signal and the portable electronic devices comprise a video camera.

Another aspect of the present invention is a camera, comprising an audiovisual recording device that generates an audiovisual signal, and a wireless network interface coupled to the audiovisual recording device and adapted to communicate the audiovisual signal to a plurality of other audiovisual recording devices. The audiovisual signal in some embodiments consists essentially of photographs. In other embodiments, the audiovisual signal comprises full-motion video.

Yet another aspect of the present invention is a computer program product, comprising a program configured to perform a method of recording events and a signal bearing media bearing the program. The method of recording events in some embodiments comprises forming an ad hoc network comprising a plurality of cameras and communicating audiovisual signals between the plurality of cameras in the ad hoc network. The signal bearing media may be non-writable storage media, alterable information stored on writable storage media, information conveyed to a computer by a communications medium, and/or a memory of a video camera.

Another aspect of the present invention is a method of charging for usage of audiovisual recording services which are accessed via an ad hoc network of providers. One embodiment of this method comprises receiving a request for audiovisual recording services; in response to the request, searching the ad hoc network for an provider of audiovisual recording services responsive to the request, and crediting an account associated with the provider. These embodiments may further comprise receiving a plurality of requests for audiovisual recording services, wherein each of the plurality of requests is associated with a bid, and selecting from among the plurality of requests. In some embodiments, the account is maintained by a third party facilitator. In other embodiments, the account comprises an indebtedness indicator.

Another aspect of the present invention is a method for real time pricing of audiovisual recording services, comprising periodically determining real time pricing for an audiovisual recording resource utilizing an ad hoc computing network, and scheduling local utilization of the audiovisual recording resource by a user in response to variations in said real time pricing.

DETAILED DESCRIPTION

Figure 1:
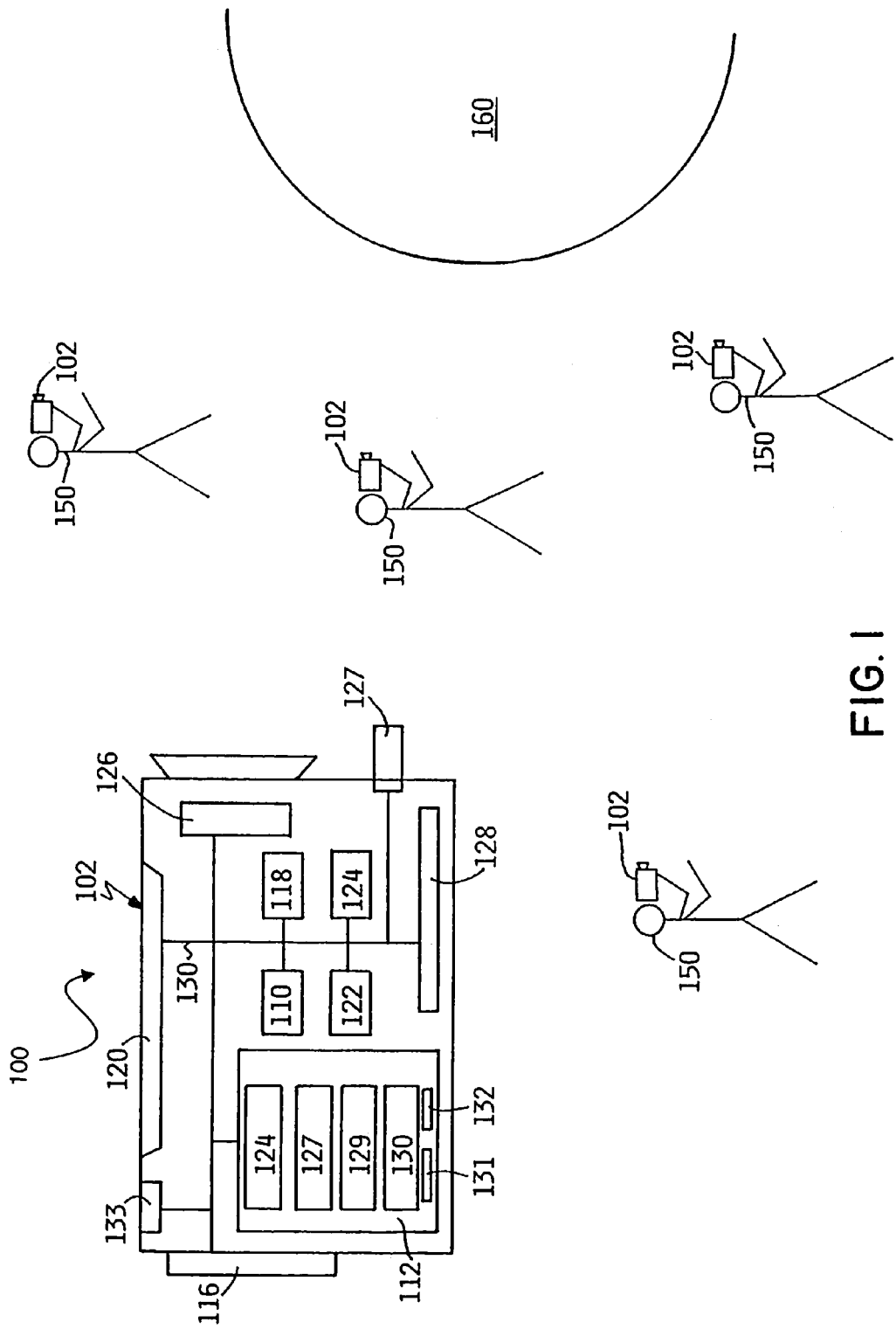
FIG. 1 depicts one embodiment of a real-time ad hock video recording system embodiment.

FIG. 1 depicts one embodiment of a real-time ad hock video recording system embodiment 100 comprising a plurality of audiovisual recording devices 102 (only one shown in detail for clarity) located at generally random locations around an event location ("stage") 160. Each recording device 102 has a central processing unit 110 ("CPU") connected to a memory 112, a view screen 116, a wireless network interface 118, an input panel 120, compression circuitry 122, a global positioning system ("GPS") receiver 124, a primary image capture device 126 (e.g., a charge-coupled device array), a primary audio capture device 127 (e.g., a microphone), a mass storage device 128, and a speaker 133 by a system bus 130. The main memory 112 contains an operating system 124, a peer-to-peer audiovisual sharing manager 127, a configuration file 129, an audiovisual storage buffer 130, a mute flag 131, and a users counter 132. Each recording device 102 is operated by an operator 150.

In operation, the recording devices 102 allow each operator 150 to simultaneously record a primary audiovisual signal from their own recording device 102 and a secondary audiovisual signal from a nearby recording device 102 (and third and forth signals from still other nearby recording devices 102). Each participating recording device 102 communicates its primary audiovisual signals to the other recording devices 102 over a wireless, ad hoc network. That is, the recording devices 102 can cooperate to form a network whose membership constantly varies as recording devices enter the area around the event location 160 and decide to participate, or stop participating, in the network. The operators 150 can select one of the saved audiovisual signals for inclusion in a "final edit" using home video editing software, or may keep both audiovisual signals as complementary views of the same event.

Some embodiments of the present invention may only have the capacity to process a certain number of audiovisual sources because they are optimized for low power use and small physical size. Other embodiments may be constrained by the bandwidth capacity of the wireless network interface 118. If there are more secondary audiovisual sources available to these embodiments than can be simultaneously transmitted and/or processed, some embodiments allow the operators 150 to manually choose one or more of the available signals using the input panel 120. Others embodiments allow the operators 150 to configure the recording device 102 to automatically select the secondary signal(s) to be recorded.

The audiovisual information in some embodiments of the present invention is transmitted to the network participants in a series of scenes. Each scene comprises a plurality of segments, with each segment comprising a few fractions of a second of audiovisual information, preferably compressed and/or encoded, and a descriptor. These segments may be time-encoded to ensure that the secondary video signals can be synchronized to the primary signals, and compressed by the compression circuitry 122 to reduce network bandwidth and storage requirements. In some embodiments, the recording devices 102 may also prioritize the broadcast of important segments, allow for operations 150 to communicate with each other using text or audio messages (e.g., "Did anyone get a good shot of that touchdown reception?"), may provide for a usage indicator to inform the operators 150 when and how many others are recording their video signals, and may allow one operator 150 to push an audiovisual signal to other recording devices 102 in the ad hoc network (e.g., if one user 150 captured a great view of a touchdown reception).

Figure 2:
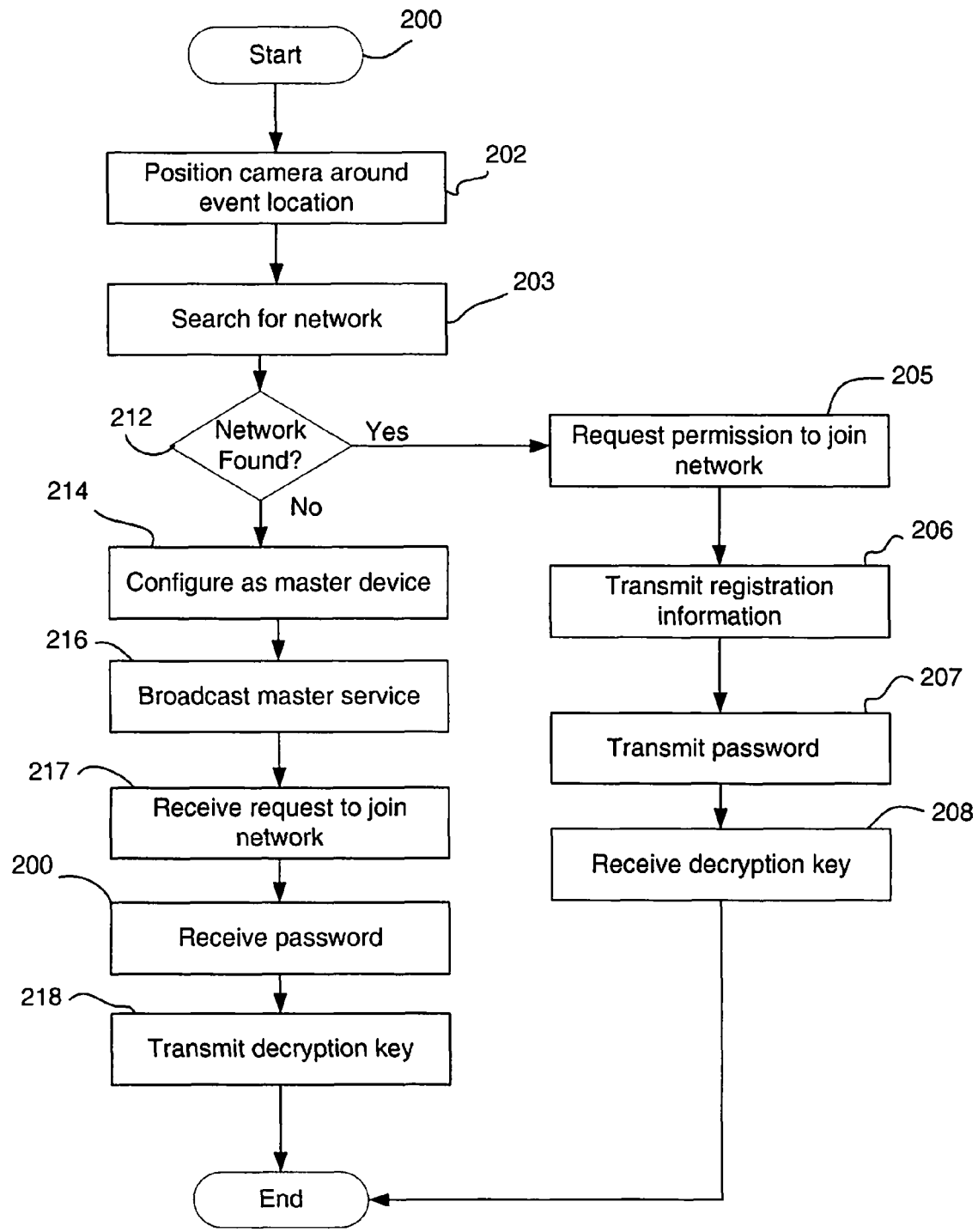
FIG. 2 illustrates one method of creating an ad-hoc network of video cameras.
Figure 3A:
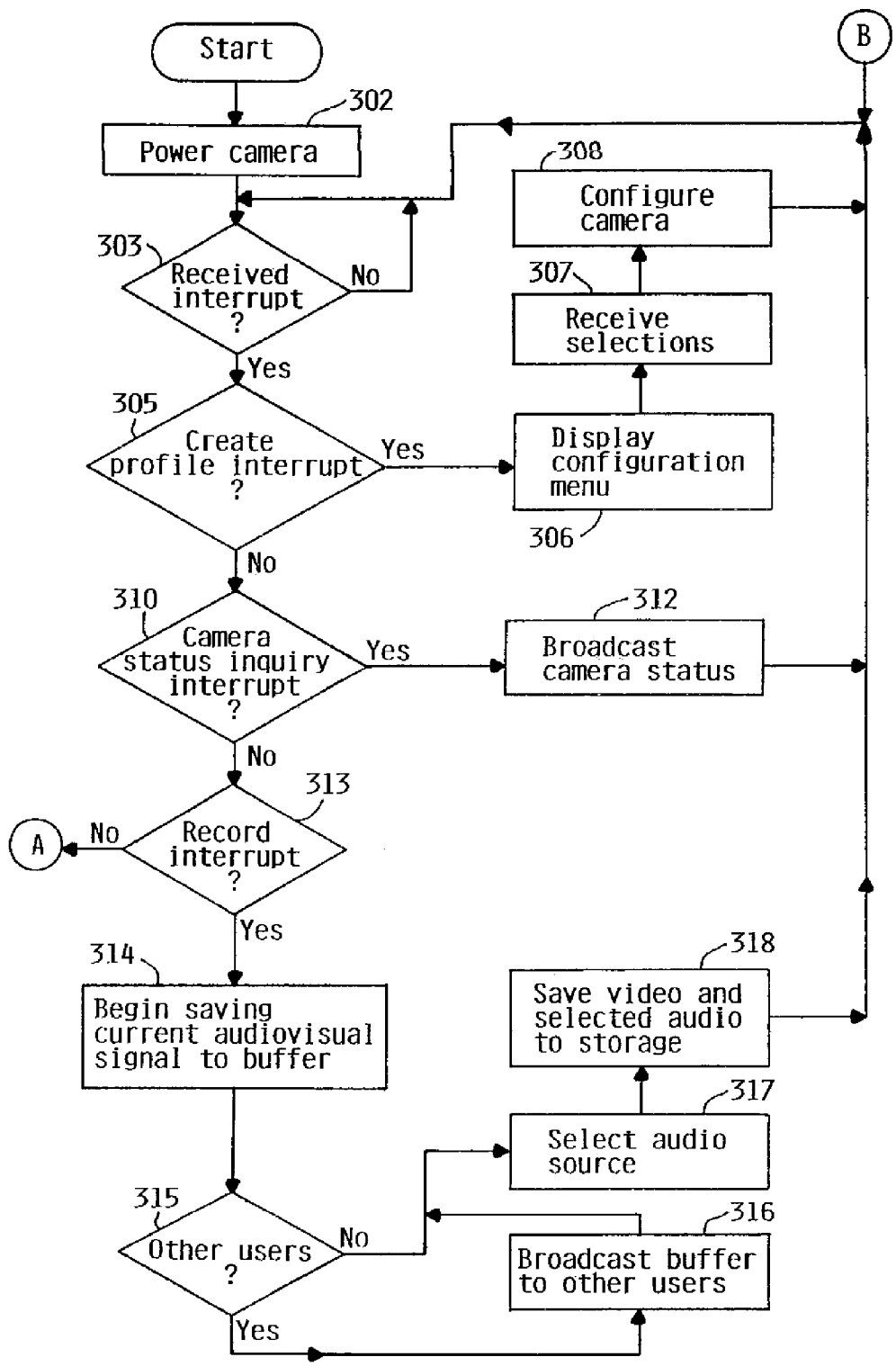
FIGS. 3A-3D (collectively "FIG. 3") illustrates the operation of one video camera embodiment.
Figure 3B:
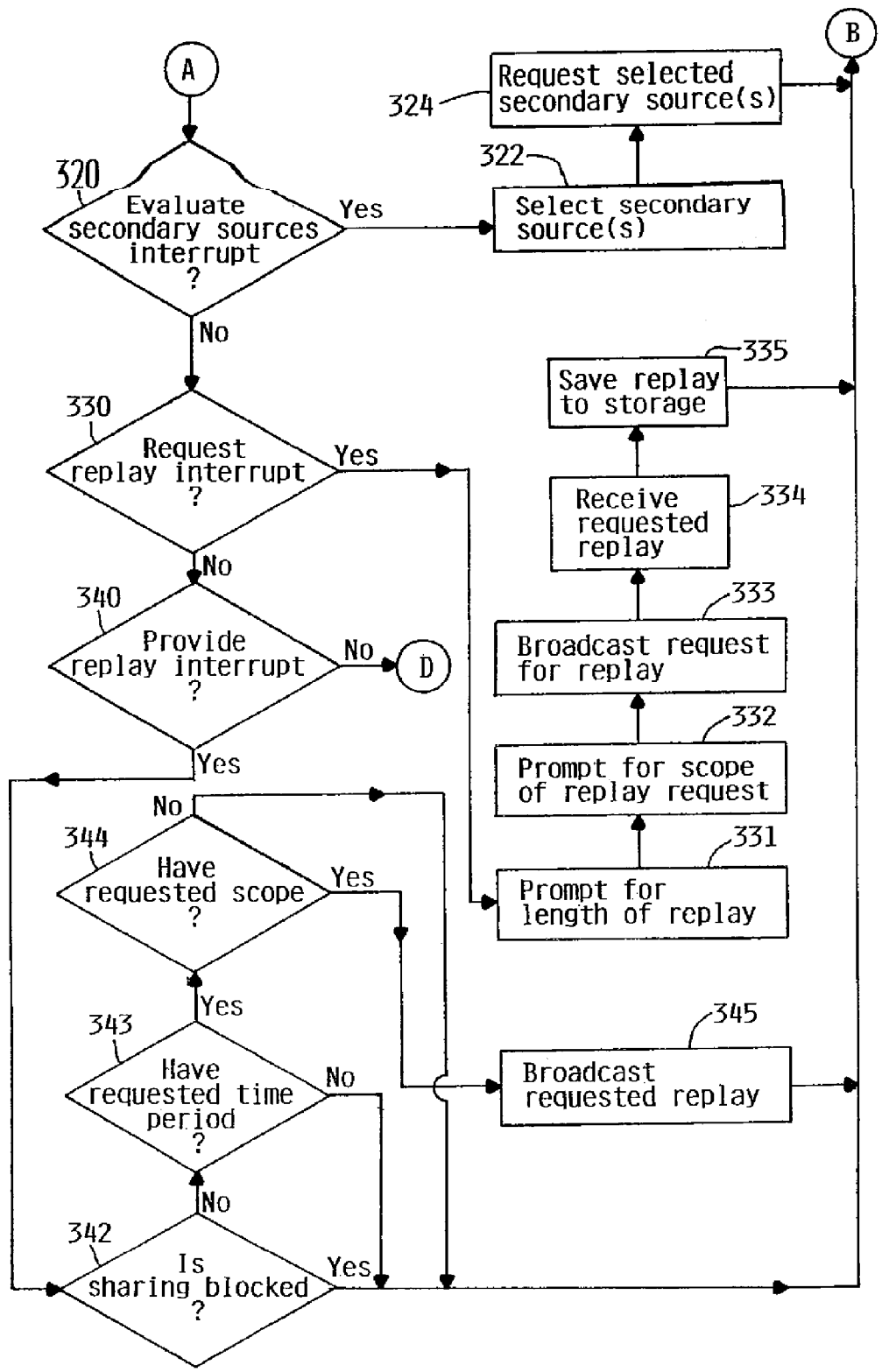
Figure 3C:
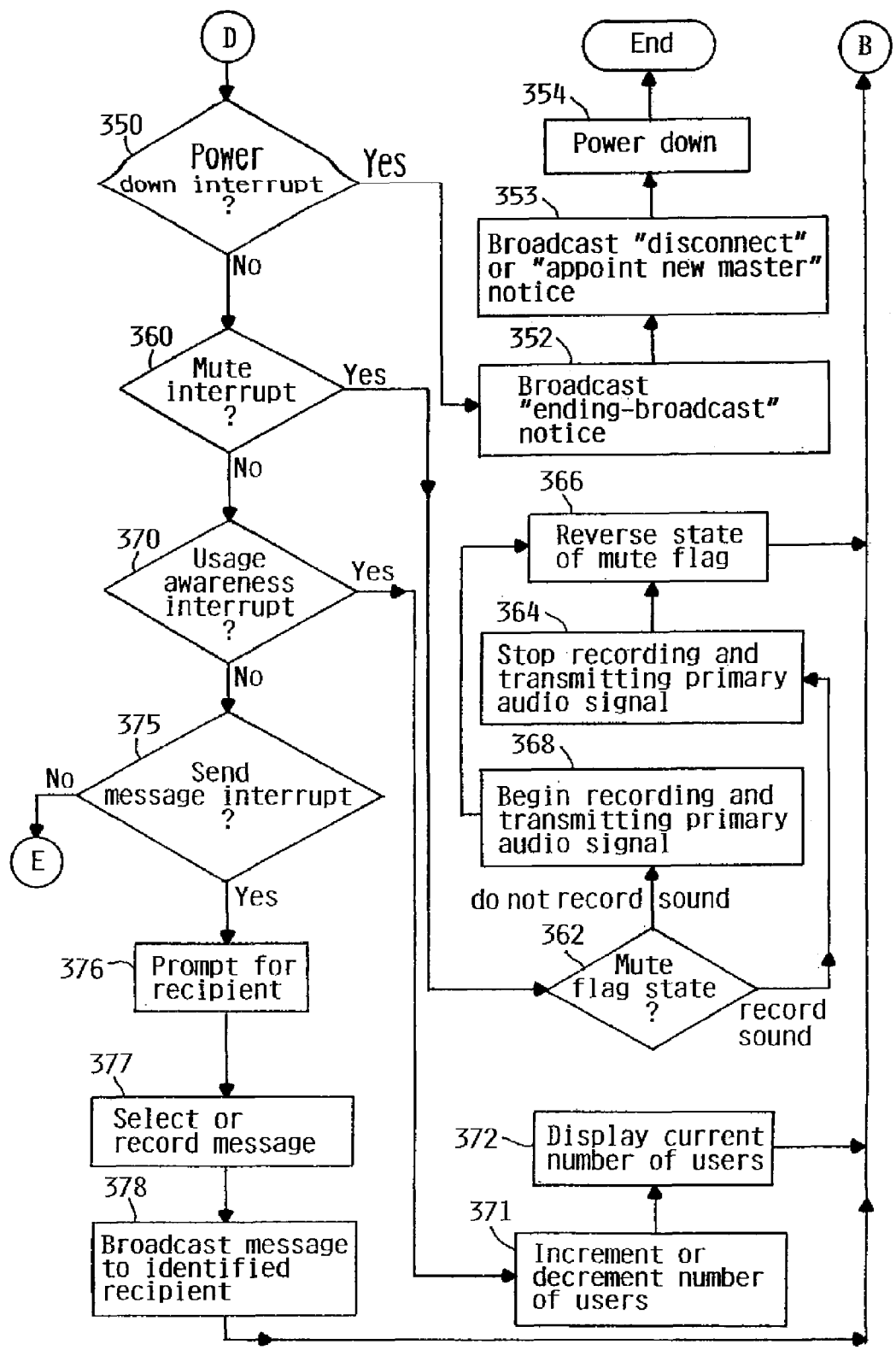
Figure 3D:
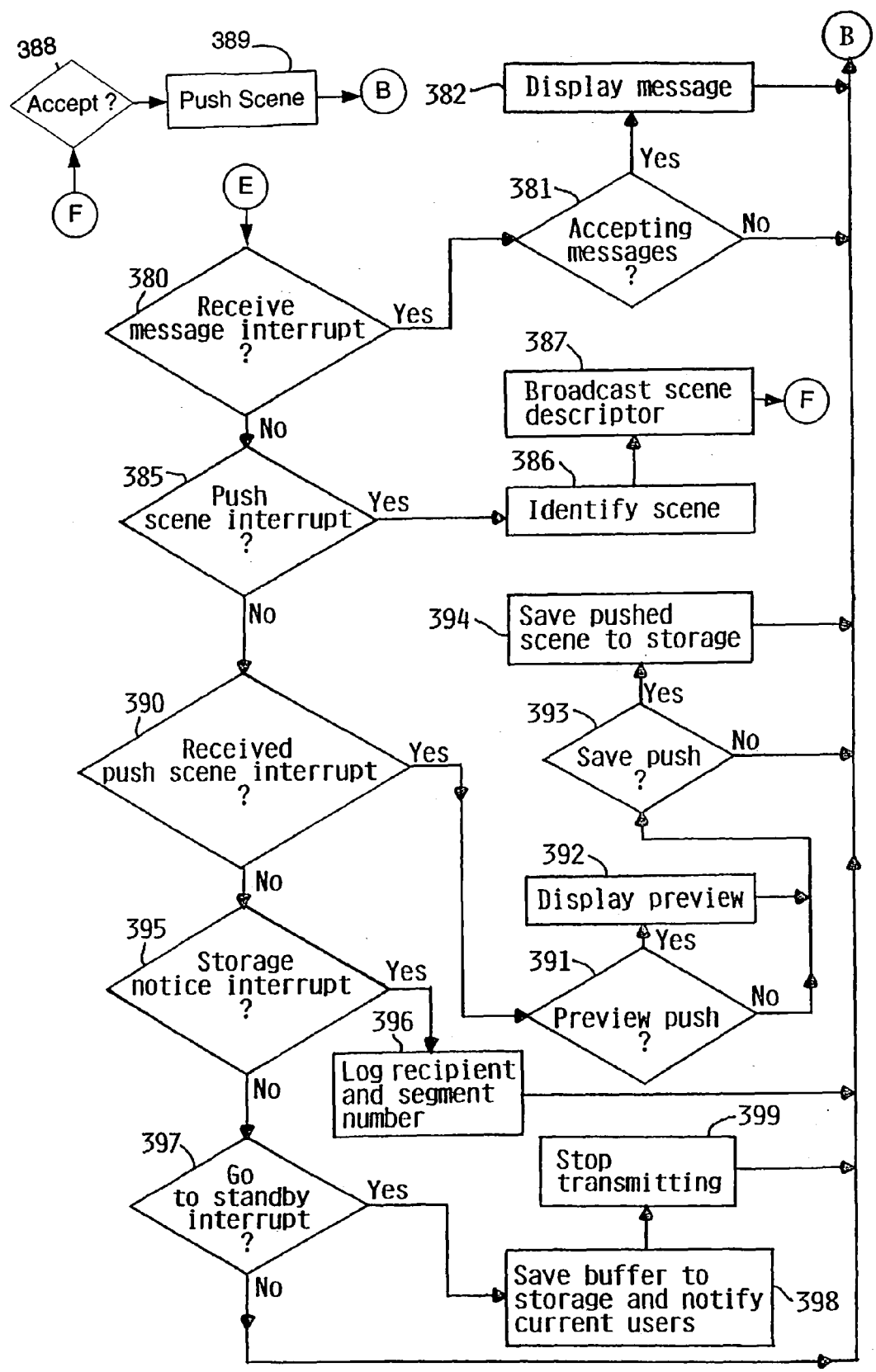

FIG. 2 illustrates one method 200 of creating an ad-hoc network of audiovisual recording devices 102. At block 202, the operator 150 arrives at an event and positions himself at a location near the stage 160. At blocks 203-204, the operator 150 powers on the recording device 102 and, using command input panel 120, instructs the recording device 102 to search for an existing ad-hoc network. If an existing network is found, the recording device 102 connects to that existing network at blocks 205-208 as a servant device. This process includes requesting permission from the network's master recording device 102 at block 205; and sending registration information, such as a unique serial number associated with the recording device 102 and its communication specifications, to the master recording device at block 206; and receiving a decryption key (which will allow the master and servant recording devices to communicate securely) from the master recording device 102 at block 208. If the recording device 102 did not find an existing network block 204, the recording device 102 configures itself to act as a master device at block 212 and begins broadcasting its master device status at block 214. If another recording device 102 wants to join the ad hoc network, the new recording device 102 sends the master recording device 102 a request to register as a servant device at block 216. At block 218, the master recording device 102 adds the new device to a list of network participants and then responds to the request by broadcasting a decryption key. In some embodiments, the registration process also includes sending and receiving a password to further enhance security (blocks 207 and 217).

FIG. 3 illustrates the operation of one recording device 102 embodiment in more detail. At block 302, the operator 150 powers up the recording device 102. Once the recording device 102 completes its power up cycle, the CPU 110 will listen at block 303 for indication of an event, commonly called an interrupt. In response, the CPU 110 will perform certain actions, and then return to block 303 to wait for the next interrupt. Blocks 305-399 represent some of the interrupts to which the CPU 110 will respond, together with the actions associated with that interrupt.

Figure 4:
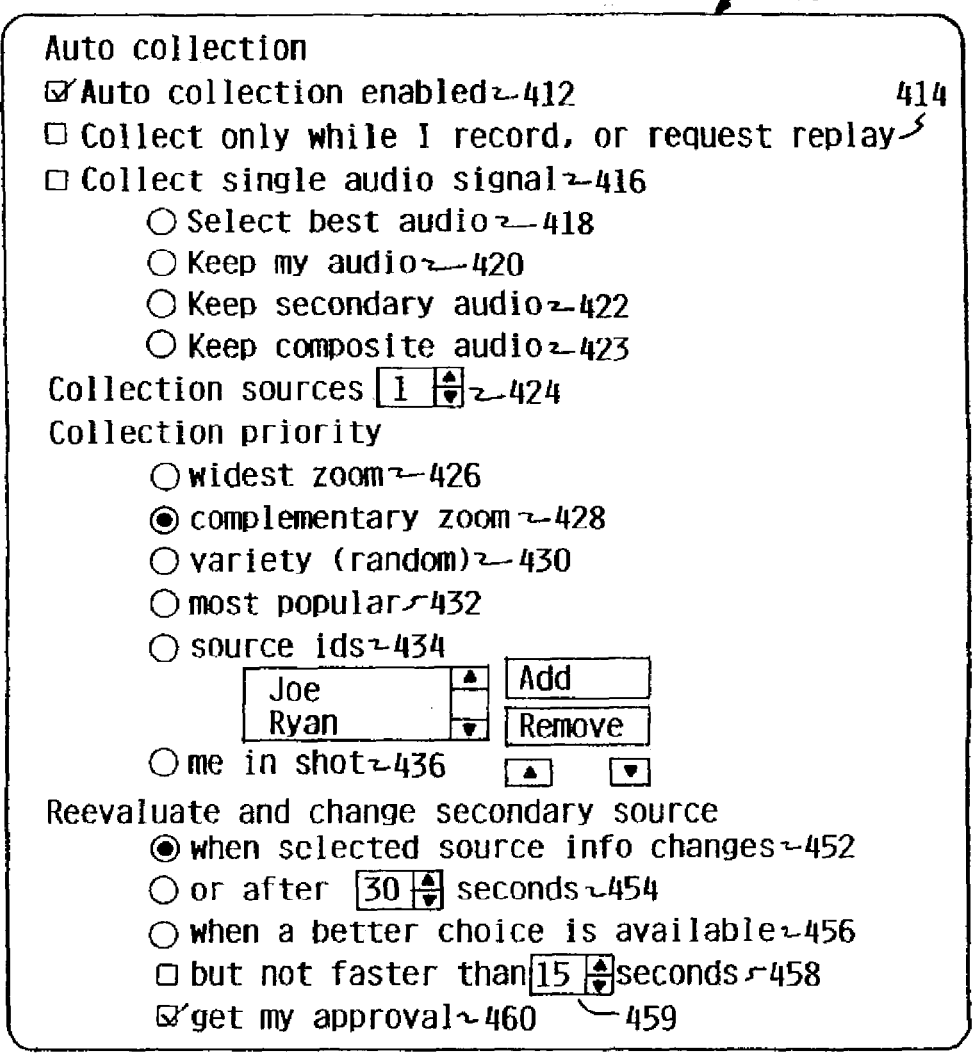
FIG. 4 illustrates one embodiment of a configuration menu.
Figure 4:
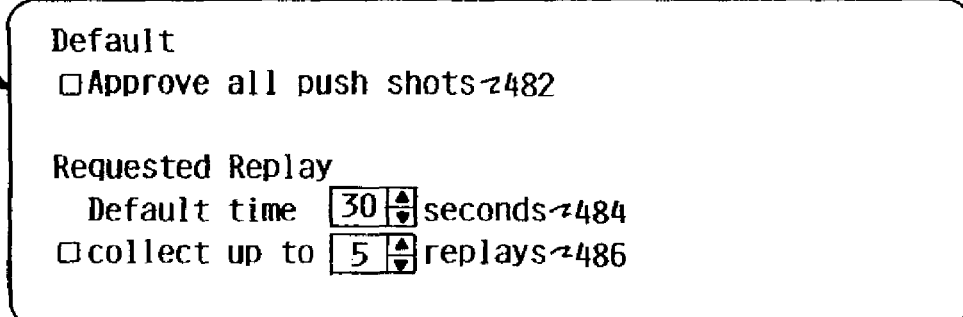

At blocks 305-306, if the CPU 110 received a create profile interrupt at block 303, the CPU 110 will display an interactive menu to the operator 150 using the view screen 116. One suitable interactive menu is illustrated in FIG. 4.

The CPU 110 will receive the desired selections from the operator 150 at block 307, and then use the selections to configure the recording device 102 at block 308.

At blocks 310-311, if the CPU 110 received a recording device status inquiry interrupt at block 303, the CPU 110 will first calculate the recording device's 102 current position and the direction it is facing (both in three-dimensions) using the GPS receiver 124. As will be discussed in more detail with reference to FIG. 7, the CPU 110 will then transmit a descriptor packet at block 312 containing the recording device's position and direction, its current zoom value, the average sound volume it receives on its microphone 127, and a modulation quality indication. This interrupt may be triggered by a request to join the ad hoc network.

At blocks 313-314, if the CPU 110 received a record interrupt at block 303, the CPU 110 will first begin to save its primary video signal to the storage buffer 130. At blocks 315-316, if any other recording device 102 has indicated that they are using this recording device's primary audiovisual signals, the recording device 102 will broadcast its primary audiovisual signal to that device 102. At block 317, the recording device 102 will select an audio source to record using the configuration information described in more detail with reference to FIG. 4, and then store the selected audio signal in the storage buffer 130. At block 318, the recording device 102 will transfer its primary video signal and the selected audio signal from the buffer 130 to the mass storage device 128.

Figure 5:
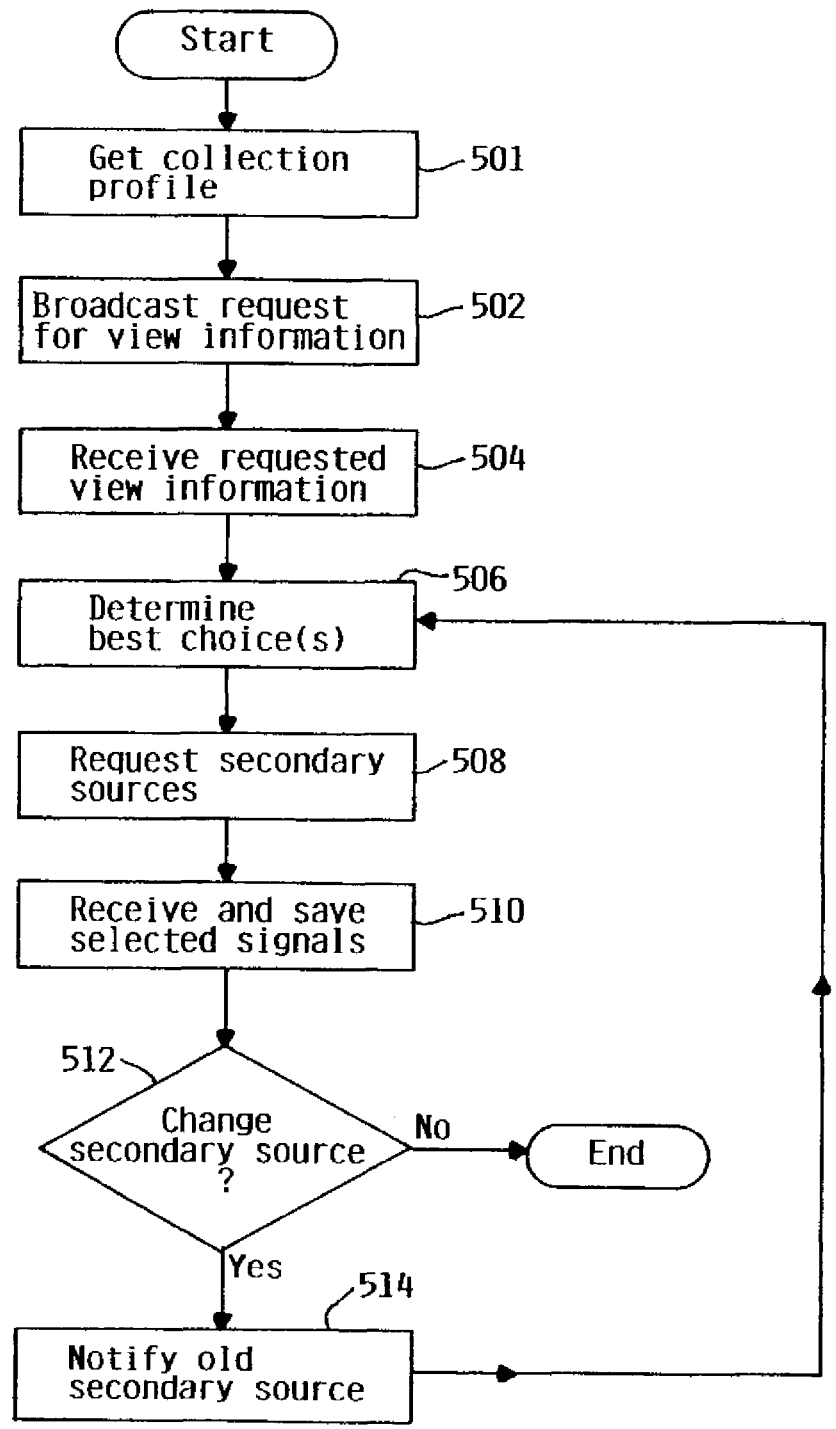
FIG. 5 illustrates one method of selecting a secondary audiovisual source.

At blocks 320-322, if the CPU 110 receives an evaluate secondary sources interrupt at block 303, the CPU 110 will then evaluate and/or reevaluate which secondary source it should record, using, for example, the method described in FIG. 5. At block 324, the CPU 100 instructs the network interface 118 to send a request to the recording device selected at block 322, asking that recording device 102 to begin transmitting its primary audiovisual signal.

At blocks 330-331, if the CPU 110 received a request replay interrupt at block 303, the recording device 102 will first ask the operator 150 how many seconds of replay it should request. At block 332, the recording device 102 will then ask the operator 150 whether he wants to request replays from all other the recording devices 102 in the ad hoc network, or only those with a complementary zoom. In some embodiments, the time interval requested in bock 331 and the scope requested in block 332 may be specified in advance in the configuration file 129. At block 333, the CPU 110 will instruct the network interface 118 to broadcast a request to the ad hoc network for audiovisual signal(s) corresponding to the time period identified in block 331 and the scope identified in block 332. At blocks 334-335, the recording device 102 receives a reply to the request, and stores the associated audiovisual signal in the storage medium 128.

At blocks 340-342, if the CPU 110 received a provide replay interrupt at block 303, the CPU 110 will first determine if the operator has temporarily blocked the share audiovisual signal features of the recording device 102. If not, the CPU 110 will then determine if it has an audiovisual signal matching the requested time period at block 343 and if its audiovisual signal matches the desired scope at block 344. If recording device 102 has an audiovisual signal matching the requested time and scope, the CPU 110 will instruct the network interface 118 to broadcast the scene to the requesting recording device at block 345.

At blocks 350-352, if the CPU 110 received a power down interrupt at block 303, the CPU 110 will first instruct the network interface 118 to broadcast an "ending-broadcast" signal to any other recording devices 102 that are using its audiovisual signal. At block 353, the CPU 110 will then broadcast a "disconnect-from-network" notification to the master recording device 102 or an "appoint-new-master" notification to the slaves, depending on whether that recording device 102 was acting as a master device or a slave device. In some embodiments, the ending-broadcast notice and the "disconnect-from-network" or "appoint-new-master" notices may be combined into a single communication. At block 354, the CPU 110 will cause the recording device 102 to power itself down.

At blocks 360-362, if the CPU 110 received a mute interrupt at block 303, the CPU 100 will first determine the state of the mute flag 131. If the mute flag 131 was previously set to "record-sound," the CPU 110 will stop recording, and instruct the network interface to stop transmitting, the audio portions of the primary audiovisual signals at block 364. The CPU 110 will then change state of the mute flag to "not-recording-sound" at block 366. If the mute flag 131 was previously set to "do-not-record-sound," the CPU 110 will begin recording the audio portions, and instruct the network interface to begin transmitting, the primary audio at block 368 and change the state of the mute flag 131 to "recording-sound" at block 366.

At blocks 370-371, if the CPU 110 received a usage awareness message interrupt at block 303, the CPU 110 will first increment or decrement the current-users counter 132, as appropriate. The CPU 110 will then cause the view screen 116 to display the current number of other recording devices 102 using its audiovisual signal to the end user 150 at block 372. This interrupt may be triggered in some embodiments when another recording device 102 begins or stops using this recording device's audiovisual signal.

At blocks 375-376, if the CPU 110 received a send message interrupt at block 303, the CPU 110 will first ask the operator 150 to identify to whom the message should be sent. In some embodiments, this is accomplished by listing the identities of other operators 150 participating in the ad hoc network and prompting its operator 150 to select the appropriate individual(s) using the input panel 120. At block 377, the CPU 110 prompts the operator 150 to select a message from a list of commonly used messages or prompts the operator 150 to record a message for the selected user 150 using the microphone 127. At block 378, the CPU 110 will then instruct the network interface 118 to broadcast the message to the recording device 102 identified at block 376.

At blocks 380-381, if the CPU 110 received a received message interrupt at block 303, the CPU will determine if the operator 150 is accepting messages. The CPU 110 will then will display the received message in the viewfinder and/or play the message using the speakers 133 at block 382.

At blocks 385-386, if the CPU 110 received a push scene interrupt at block 303, the CPU 110 will first identify the segment to be pushed to the other recording devices 102 in the ad hoc network. In some embodiments, the CPU 110 will prompt the user 150 to use the input panel 120 to mark the start and end of the desired scene. In other embodiments, the CPU 110 will transmit a default time period ending when the operator 150 triggered the push scene interrupt. In still other embodiments, the CPU 110 will automatically detect the end of a scene by analyzing the audiovisual signal captured by the primary image capture device 126. The CPU 110 will then instruct the network interface 118 to broadcast a descriptor packet describing the push scene to the other recording devices 102 in the ad hoc network at block 387. At blocks 388-389, if any recording devices 102 accept the pushed scene, the CPU 110 then instructs the network interface 118 to broadcast the push scene to those devices.

At blocks 390-391, if the CPU 110 received a receive push interrupt at block 303, the CPU 110 will first prompt the operator 150 for whether they want to view a preview of the push scene. If the operator 150 indicates affirmatively, the CPU 110 will then display a preview of the push scene on the video screen 116 at block 392. In some embodiments, the preview may be displayed in a picture-in-picture window so that the operator 150 can simultaneously view the preview and the primary audiovisual signal. At block 393, the CPU 110 will prompt the operator 150 to indicate whether it should save the push scene in the mass storage unit 128. If the operator 150 answers affirmatively, the CPU 110 will then save the push scene in the mass storage unit 128 at block 394.

At blocks 395-396, if the CPU 110 received a storage notice receipt interrupt at block 303, the CPU 110 will add an identifier of the recipient and segment number to the segment usage log.

At blocks 397-398, if the CPU 110 received a go-to-standby interrupt at block 303, the CPU 110 will save the current buffer 130 to the storage device 128 and instruct the network interface 118 to broadcast the last segment to any listeners. The CPU will then instruct the network interface to stop transmitting at block 399.

FIG. 4 illustrates one embodiment of a configuration menu 400, which allows operators 150 to specify how they want their recording device 102 to operate. This menu 400 embodiment comprises an auto-select configuration section 410 and a default configuration section 480. The auto-select configuration section 410 contains a selection box 412 that specifies whether the operator 150 wants the recording device 102 to select a secondary source or whether the operator 150 will select the secondary source themselves; a selection box 414 that specifies whether the recording device 102 should collect secondary signal(s) only when it is recording the primary signal 412 or at all times; a selection box 416 that specifies whether the recording device 102 should use a single audio signal for all video signals or whether the recording device 102 should record the audio signals for every video signal; and an input field 424 that specifies how many secondary sources the recording device 102 should collect.

If the operator 150 indicated that the recording device 102 should use a single audio source for all of the video sources, the operator 150 can select the desired audio source using radial inputs 418-423. More specifically, radial input 418 indicates that the recording device 102 should use the highest quality source for all video signals, as indicated using the modulation quality indicator in the descriptor packets; radial input 420 indicates that the recording device 102 should use its own audio signal for all video signals; radial input 422 indicates that the recording device 102 should use the secondary audio signal for all video signals; radial input 423 indicates that the recording device should use a composite audio signal comprising sound common to all video signals (e.g., the recording device 102 should record only the sounds that appear in more than one audio signal). Some embodiments may also allow the operator 150 to select multiple audio sources to record along with a particular video signal (e.g., record two video sources and five audio sources), which may be desirable because it requires less information.

If the operator 150 indicated that the recording device 102 should select the secondary audiovisual source(s), the operator 150 can configure which sources should have the highest priority using radial inputs 426-436. More specifically: (i) radial input 426 indicates that the recording device 102 should select to the audiovisual source with the widest zoom; (ii) radial input 428 indicates that the recording device 102 should select the audiovisual source with a zoom value that is complementary to this recording device's zoom value (e.g., if the primary source is collected with a high zoom value, the recording device should select a secondary source filmed using a low zoom value); (iii) radial input 430 indicates that the recording device 102 should select a random video source; (iv) radial input 432 indicates that the recording device 102 should select the secondary audiovisual source requested by the most other operators 150; (v) radial input 434 indicates that the recording device 102 should select the audiovisual source created by another operator 150 known to be highly skilled or with whom the operator 150 has prearranged agreement to work cooperatively; and (vi) radial input 436 indicates that the recording device 102 should collect the audiovisual source showing its own operator 150. Some embodiments may allow the operator to indicate a priority for each of these choices 426-436. For example, in these embodiments, the operator 150 could indicate that the recording device 102 should select a complementary zoom if available, otherwise select something with the operator 150 in the shot. If neither is available, then select the most popular shot.

Some embodiments may also provide heuristics select a complementary angle. For example, if the operator 150 is seated north-east of the stage 160, the recording device 102 may give select a secondary audiovisual signal generated by an operator 150 seated at the north-west side of the stage. In this way, one two recording devices 102 should be able to capture a clear shot of any event on the stage 160. One way of determining complementary angle is to use the position and direction information generated by the GPS receiver 124.

The auto-select configuration section 410 also contains several fields for configuring how often the recording device 102 should revaluate its secondary source selection(s). More specifically, radial box 452 indicates that the recording device 102 should revaluate whenever there is a change in the view identification information for selected source (as communicated using the descriptor packets described with reference to FIG. 7), and radial box 454 indicates that the recording device 102 should reevaluate after the expiration of a predetermined amount of time. Radial box 456 indicates that the recording device 102 should switch secondary sources whenever a secondary source becomes available, radial box 458 indicates that the recording device 102 should switch whenever a better choice is available, and radial box 460 indicates that the recording device should switch secondary sources only after approval by the user 150. The options configured by radial box 458 can also be further configured using selector 459 so that the recording device 102 will not switch or ask for permission if it previously switched secondary sources within a predetermined amount of time. This option may be desirable to prevent rapid scenes from getting cut too rapidly due to secondary source changes.

The default configuration section 480 allows the operator 150 to answer certain inquiries in advance. More specifically, selector 482 indicates that the operator 150 wants to approve all push shots. Selector 484 allows the operator to specify a default length of all replay requests. Selector 486 allows the operator 150 to specify the number of replays it should save in response to a replay request.

FIG. 5 illustrates one method of selecting a secondary audiovisual source. At block 501, the recording device 102 determines the operator's preferences using the configuration menu described with reference to FIG. 4. At block 502, the recording device 102 broadcasts a request for view information to other recording devices 102 in the ad hoc network. At block 504, receives the view information from the other recording devices. At block 506, the recording device 102 uses the view information and the collection profile collected at block 501 to determine which secondary source(s) is/are the highest priority. Next, at block 508, the recording device 102 requests the selected audiovisual signals from the associated recording device(s) 102. At block 510, the recording device 102 receives and saves the selected audiovisual signals. At blocks 512-514, if the selected view changes, the recording device 102 notifies the old secondary source that the recording device 102 is no longer using its audiovisual signal.

Figure 6:
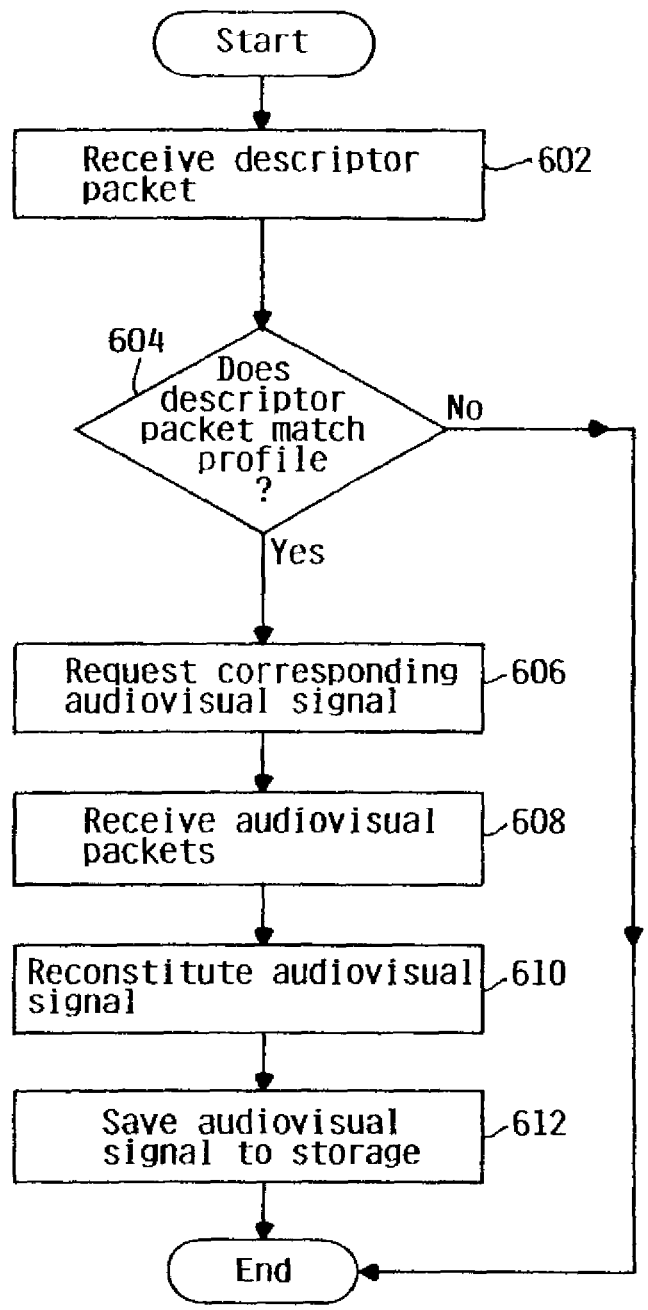
FIG. 6 illustrates one method of receiving an audiovisual signal from another recording device.

FIG. 6 illustrates one method of receiving a secondary audiovisual source from another recording device 102. At block 602, the CPU 110 receives a descriptor packet receipt interrupt. At block 604, the CPU 110 parses the descriptor packet to determine if the corresponding audiovisual source matches the profile in the configuration file 129 (as described with reference to FIG. 4). If the recording device 102 decides to request the associated scene, the CPU 110 instructs the network interface 118 to broadcast a response back to the transmitting recording device 102 at block 606. At blocks 608-610, the recording device 102 receives a plurality data packet containing the audiovisual signal and uses the packets to reconstitute the full audiovisual signal. At block 612, the recording device 102 stores the scene in the storage device 128. Other embodiments of the invention may combine the descriptor packet and the data packet into one transmission. These embodiments may be desirable if the network has sufficient bandwidth.

Figure 7:
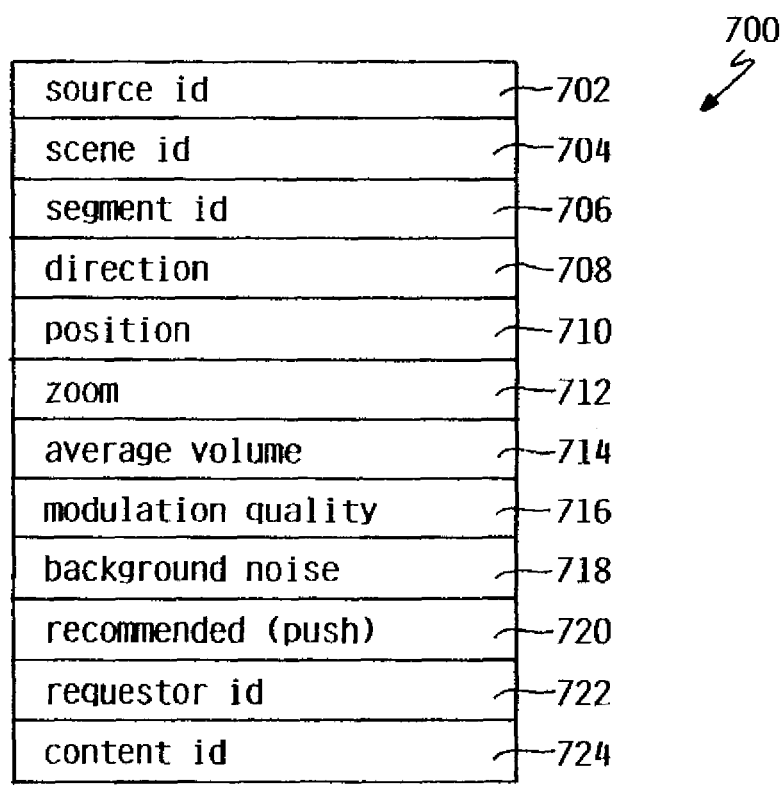
FIG. 7 illustrates one embodiment of a descriptor packet.

FIG. 7 illustrates one embodiment of a descriptor packet 700. This embodiment comprises a source identifier 702 that identifies the particular recording device 102 that sent the packet, a scene identifier 704 that identifies a particular scene, and a segment identifier 706 that identifies what portion of the scene will be transmitted in the corresponding data packet. The descriptor packet 700 also contains location information comprising a three-dimensional vector 708 on which the recording device 102 was pointing when it collected the audiovisual information, the three-dimensional location 710 of the recording device 102, and a zoom value 712. In addition, the descriptor packet 700 comprises an average audio volume 714, an average audio modulation quality indicator 716, a background noise level indicator 718, a flag 720 indicating that the packet is recommended by another user who is "pushing" it out to the others, and an identifier 724 of the content packet associated with the descriptor packet 700. In some embodiments, the descriptor packet 700 may further contain a requestor identifier 722 indicating which recording device 102 asked for the scene to be broadcast. This identifier may be desirable because it allows the receiver device 102 to recognize the packet it requested.

Referring again to FIG. 1, the recording devices 102 can be any device capable of recording and transmitting audiovisual signals, which in turn can include audio and visual information, alone or in combination, as well as other sensory information. Accordingly, recording device 102 embodiments include, without limitation, video cameras and camcorders that record and transmit full motion audiovisual signals, photographic cameras that record and transmit still-images, hybrid cameras that record both video and images, and audio-only recording devices (e.g., an cellular telephone and "MP3" devices). Other sensory information may include olfactory information, tactile information, and information about the local environmental conditions.

The recording devices 102 of the present invention can collect and store their audiovisual signals using analog or digital means, or a combination of both. The network interfaces 116, accordingly, can be any device that facilitates such communication, regardless of whether the network connection is made using present-day analog and/or digital techniques or via some networking mechanism of the future. Suitable communication mediums 106 include, but are not limited to, wireless networks implemented using the Transmission Control Protocol/Internet Protocol ("TCP/IP") protocol over one of the IEEE 802.11 (also known as "WiFi"), IEEE 802.16, or Bluetooth specifications. Other embodiments may use Ultra Wide Band ("UWB") technology, such as that described in FCC 02-48, which is herein incorporated by reference in its entirety. Moreover, those skilled in the art will appreciate that many other communication mediums and protocols are within the scope of the present invention.

The video buffer 130 and the storage device 130 work cooperatively in this to store the primary video signal from the image capture device 126 and the secondary video signal(s) from the wireless network. Suitable storage devices include, without limitation, hard disk drives, tape (e.g., mini-DV), flash memory devices, secure digital devices, Memory Stick devices, Microdrive devices, writeable compact disks (e.g., CD-R and CD-RW) and digital versatile disks (e.g., DVD, DVD-R, DVD+R, DVD+RW, DVD-RAM), holography storage systems, blue laser disks, and IBM Millipede devices. Some embodiments may also use a combination of volatile and non-volatile storage for one or both of the video buffer 130 and the storage device 130.

The central processing units 110 may be any device capable of executing the program instructions stored in main memory 112, and may be constructed from one or more microprocessors and/or integrated circuits. In this embodiment, when one of the recording devices 102 is powered up, the associated CPU 110 initially executes the program instructions that make up the operating system 124, which manages the physical and logical resources of the computer system 102. Moreover, although each recording device 102 in FIG. 1 is shown to with only a single processing unit 110, those skilled in the art will appreciate that the present invention may be practiced using a recording device 102 that has multiple digital signal processors that work cooperatively with the central purpose processing unit 110 to off-load compute-intensive processing. The compression circuitry 122 is one example of a digital signal processor that may be used to take load off the CPU 110.

The embodiments described with reference to FIGS. 1-7 generally use a peer-to-peer network architecture. These embodiments are desirable because the recording devices 102 can form a cooperative group in the absence of a central server or router. However, those skilled in the art will appreciate that other network architectures are within the scope of the present invention. Examples of other suitable network architectures include client/server architectures, grid architectures, and multi-tier architectures. Moreover, those skilled in the art will appreciate that the mechanisms and apparatus of the present invention apply equally to multi-purpose devices, such as a mobile telephones or personal digital assistants ("PDAs") equipped with a built-in video recording device.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

Some embodiments of the present invention may also provide a credit and audit trail system. In these embodiments, the CPU 110 keeps track of everyone who uses its audiovisual signal and everyone whose audiovisual signal it has used. The CPU 110 can use this information to allow each operator 150 to determine whether they are "indebted" to another. Thus, for example, if one operator 150 asks another operator 150 to focus on a particular child and the requestor operator 150 has been particularly helpful to the requestee operator and/or the ad hoc network, requestee operator 150 may be more willing to grant the special request. This information may also allow for a rating system of operators 150.

Still other embodiments may be designed to work in conjunction with permanent audiovisual equipment located at the event site 160. For example, concert sites 160 may provide one or more audio feeds containing the output of the stage microphones (i.e., the microphone recording devices 102 are permanently part of the stage 160). The recording devices 102 could then select these audio signals to record with the primary and secondary video signals. These embodiments may be desirable because this audio signal may contain less crowd noise, echoes, and the like. Other event sites 160, such as sporting events, may provide an overhead camera 102 that operators 150 can select as one of the secondary video signals. In some embodiments, the event site 160 may charge a fee for this service.

Some embodiments may provide for a third-party credit and audit trail system. In these embodiments, the operators 150 may create an account with the third party facilitator. Each time the operator 150 requests a particular shot, the third party facilitator will debit the requestor's account and credit the requestee's account. The amount charged for this service may be a fixed fee or may be dependent on the quality of the shot (e.g., charge more for higher resolution signals, for signals captured from locations near the event site, for popular signal, and/or for signals that contain unusual events). Some embodiment may use auction pricing to prioritize what requests get priority or dynamic pricing models, such as that described in U.S. Pat. No. 6,591,253, which is herein incorporated by reference in its entirety, to determine what prices to charge. The third party facilitator in these embodiments may also deduct a service fee for arranging the transaction. Those skilled in the art will appreciate that these embodiments may be particularly desirable when combined with event-site provided recording devices 160.

Those skilled in the art will appreciate that the present invention provides numerous advantages over conventional audiovisual recording systems. For example, the secondary recording channel of the present invention allows for useful automation of sharing by allowing each operator 150 to take video of what they think is best, while having the automated second channel can pick up other shared signals. Each operator 150 can then replace or supplement the primary track with the secondary information during editing. This feature and advantage may allow operators 150 to memorialize important events they may otherwise have missed. The present invention and its ad hoc, real-time peer-to-peer network also allow operators 150 to take share their audiovisual signals without having to make arrangements before the event.

The present invention and its replay feature may be desirable because they allow the operator 150 both get the audiovisual signal containing a memorable event and to continue recording the current events. Some embodiments may also allow an operator 150 to notify other operators 150 that they caught a great shot, and allow those other operators 150 to request that shot. In other words, these embodiments provide a push system with approval.

The automatic selection feature in some embodiments of the present invention may be desirable for use at sporting events and the like because the memorable scenes at these events are often unpredictable. Thus, for example, if the operator 150 of one recording device 102 misses an event because they were zoomed in on one player, the operator 150 can get the memorable event by requesting a replay or accepting a push from another operator 150.

The request-response protocol described in FIGS. 1-7 may be desirable where network bandwidth is constrained because these embodiments only broadcast important scenes. Other embodiments optimized for high bandwidth networks may include an "always broadcasting" mode. In these embodiments, the recording device 102 will transmit its primary audiovisual signal to the ad hoc network whether or not another device 102 has requested it. Other devices can then pick-and-choose secondary sources as desired.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

I claim:

1. A camera, comprising:
   an audiovisual recording device that generates a primary audiovisual signal;
   a wireless network interface coupled to the audiovisual recording device and adapted to communicate the primary audiovisual signal to a plurality of other audiovisual recording devices over an ad hoc network, the wireless network interface further adapted to receive a secondary audiovisual signal and a descriptor packet associated with the secondary audiovisual signal from another recording device in the ad hoc network;

wherein the descriptor packet describes the content of the secondary audiovisual signal and wherein the descriptor packet includes recording device location information to enable complimentary angle selection; and a processor adapted select a preferred secondary audiovisual signal based on the contents of the descriptor packet; and a storage medium that simultaneously records the primary audiovisual signal and the selected secondary audiovisual signal.

2. The camera of claim 1, further comprising a peer-to-peer network manager coupled to the wireless network interface, wherein the peer-to-peer network manager cooperates with the wireless network interface to communicate with the ad hoc network of audiovisual recording devices.

3. The camera of claim 1, wherein the audiovisual recording device comprises a charge-coupled device array.

4. The camera of claim 1, wherein the audiovisual signal comprises a video signal and an audio signal.

5. The camera of claim 1, wherein the audiovisual signal consists essentially of photographs.

6. A computer program product, comprising:
(a) a program configured to perform a method of recording events, comprising:
joining a first recording device to an ad hoc network comprising a plurality of recording devices, the first recording device comprising a network interface, an audiovisual capture device that generates a primary audiovisual signal, and a storage medium;
receiving a secondary audiovisual signal and a descriptor packet associated with the secondary audiovisual signal via the network interface from another recording device in the ad hoc network, the descriptor packet describing the content of the secondary audiovisual signal;
wherein the descriptor packets include recording device location information to enable complimentary angle selection;
configuring the recording device to select a preferred secondary audiovisual signal based on the contents of the descriptor packet; and
recording simultaneously the primary audiovisual signal and the selected secondary audiovisual signal onto the storage medium of the first recording device; and
(b) a non-transitory computer-readable medium bearing the program.

7. The computer program product of claim 6, wherein the non-transitory computer-readable medium comprises a memory of a video camera.

8. The computer program product of claim 6, wherein the ad hoc network comprises at least one recording device provided by an event site.

9. The computer program product of claim 6, wherein the program further comprises a peer-to-peer module that manages the communication of the audiovisual signals.

10. The computer program product of claim 6, further comprising transmitting a replay request to the plurality of recording devices; and receiving an audiovisual signal corresponding to the replay request.

11. The computer program product of claim 6, further comprising transmitting a push request to the plurality of recording devices.

12. The computer program product of claim 6, further comprising transmitting a message to at least one of the plurality of recording devices.

13. The computer program product of claim 6:
wherein the primary audiovisual signal comprises a primary video signal and a primary audio signal;
wherein the secondary audiovisual signal comprises a secondary video signal and a secondary audio signal; and
further comprising selecting an audio signal to record with the primary video signal and the secondary video signal.

14. The computer program product of claim 13, wherein the audio signal recorded with the primary video signal and the secondary video signal comprises a composite audio signal.

15. The computer program product of claim 6, wherein the preferred secondary audiovisual signal is chosen from the group consisting of an audiovisual signal having a widest zoom, an audiovisual signal having a complementary zoom, an audiovisual signal having a complementary angle as defined by position and direction, a most popular audiovisual signal, an audiovisual signal showing a camera operator, and an audiovisual signal created by a specific individual.

16. The computer program product of claim 6, wherein the ad hoc network further comprises an event site audiovisual source.

17. The computer program product of claim 6, wherein the plurality of recording devices that form the ad hoc network varies as recording devices enter and leave an event location.

18. The computer program product of claim 17, wherein the ad hoc network comprises a peer-to-peer network architecture.

19. The computer program product of claim 17, wherein the plurality of recording devices communicate directly with each other via the ad hoc network.

* * * * *